Patented June 5, 1951

2,555,889

UNITED STATES PATENT OFFICE 2,555,889

MANUFACTURE OF BENZENE HEXACHLORIDE

Alfred Jerome Kolka, Birmingham, and Harold David Orloff, Detroit, Mich., assignors to Ethyl Corporation, New York, N. Y., a corporation of Delaware No Drawing. Application May 20, 1950, Serial No. 163,329

6 Claims. (Cl. 204—163)

This invention relates to the manufacture of benzene hexachloride by reacting benzene and chlorine in the presence of actinic light and selected additives which are used to increase the gamma isomer content of the product.

Benzene hexachloride is a well-known commercial insecticide. It is also well known that the gamma isomer is the most important, not only because it is of higher potency, but also because its toxicity is not passed on to humans and stock to any appreciable extent. The other isomers have little, if any, effectiveness as an insecticide and some of them are harmful to humans and stock.

Ordinarily, by reacting benzene and chlorine in the presence of actinic light, benzene hexachloride containing about 12 to 13 percent by weight of the gamma isomer, is obtained. This product is either sold as a low-grade product, or the gamma content is concentrated by solvent extraction and crystallization. The gamma isomer is either sold for a premium or used to raise the gamma content of low-grade benzene hexachloride in order to increase the latter's market value or in some cases to make the low-grade benzene hexachloride marketable. Thus it is obvious that any process which will increase the gamma content is important.

It is therefore an object of our process to conduct the present processes for making benzene hexachloride in the presence of additives which will increase the gamma content as much as 20 to 40 per cent.

The above object is accomplished by the photocatalyzed addition chlorination of benzene in the presence of sulfur, selenium, tellurium and their chlorine compounds.

Besides the above obvious advantages of our process, the attainment of a higher gamma content not only usually increases the total production of the gamma isomer for any given apparatus but also makes it possible to market a product without further treatment, which product otherwise would not be marketable. Furthermore where concentration of the gamma is effected, savings are made due to the handling of less material.

Our process is particularly advantageous as a continuous process, using a transparent coil surrounded by actinic light. In such a process the benzene to chlorine ratio must be relatively high in order to maintain the benzene hexachloride in solution. Complete conversion of the chlorine is desired not only to obtain the maximum capacity but to simplify the separation and recovery steps. However, in some instances when the light intensity is adjusted to convert all of the chlorine, the gamma content of the benzene hexachloride product has been known to decrease to as low as 4 per cent. Such a low gamma product is unmarketable or requires expensive processing to concentrate it. Thus in present continuous processes the chlorine is not completely converted when it is desired to obtain the highest possible gamma yield. However, by use of one of our additives for increasing the gamma content, maximum capacities are obtained with complete conversion of the chlorine.

Our process is preferably conducted at temperatures between 10 and 80° C. Substantially atmospheric pressure is all that is required although higher pressures can be used. Actinic light ordinarily employed for this purpose is used, say between 3000 and 6000 angstrom units. The benzene to chlorine ratio is preferably between 3:1 and 15:1.

The form of the sulfur, selenium or tellurium is relatively unimportant. Both the crystalline and the amorphous forms have been used. It is preferable, due to the small quantities used, that the additive used is finely divided in order to insure its full use. Quantities of the additive between .02 to 2 parts to 100 parts of benzene give good results although a narrower range between .05 to 1 is preferred. The additive is not consumed and is recovered in the excess benzene which is recycled to the reaction step of the process. Besides the elemental sulfur, selenium and tellurium, their chlorine derivatives such as sulfur monochloride, sulfur dichloride, sulfur tetrachloride, selenium monochloride, selenium tetrachloride, tellurium dichloride and tellurium tetrachloride can be successfully employed.

Our invention can be best understood by referring to the following working examples:

Five-hundred and twenty-five (525) parts of benzene were introduced into a reaction vessel surrounded by a water-cooled jacket and provided with a reflux condenser. To the benzene in the reaction vessel was added 90 parts of chlorine and the temperature was held at about 25° C. for a period of about two and one-half hours. During this period the reaction solution was illuminated by clear glass infrared lamps in order to accomplish the addition photochlorination of the benzene. At the end of the test, the benzene was removed from the benzene hexachloride product by steam distillation although reduced pressure could be used to accomplish the same purpose. The yield of benzene hexachloride based on the chlorine was 100 weight per cent and the product contained 12.5 per cent of the gamma isomer, based on infrared analysis. In other words, 12.5 per cent of the gamma isomer, based on the chlorine charged was obtained. The above test can be considered as a blank run.

In another test similar to the one described above, except that 3.12 parts of sulfur monochloride was added to the benzene at the beginning of the test and 130 parts of chlorine were used, yields of 17.7 weight per cent of the gamma isomer, based on the chlorine charged, was obtained. The gamma content in the product was over 18 per cent by weight. This was an increase of 41.5 weight per cent over that obtained in the above test when no additive was employed.

In a similar test using the same amount of benzene, 119 parts of chlorine and 2 parts of powdered sulfur, 15.3 weight per cent of the gamma isomer based on the chlorine charged was obtained. When amorphous powdered selenium was added to the 525 parts of benzene, and 122 parts of chlorine then added in a manner similar to that given above, a benzene hexachloride product containing 16.5 weight per cent of the gamma isomer or a yield of 14.9 per cent of the gamma isomer, based on the chlorine charged, was obtained.

In another example using 1 part tellurium chloride, 350 parts of benzene and 122 parts of chlorine, over 15 per cent of the gamma isomer was obtained in the benzene hexachloride product.

In all of the above examples the gamma isomer was determined by infrared analysis. The non-gamma isomers in the main were alpha, beta, delta and epsilon.

We claim:
1. In the process of manufacturing benzene hexachloride by the photochlorination of benzene, the improvement comprising conducting said photochlorination of benzene in admixture with an additive selected from the class consisting of sulfur, selenium, tellurium and chlorides thereof, the concentration of said additive being within the range of approximately .02 to 2.0 parts per 100 parts of benzene.
2. The process of claim 1 in which the additive is sulfur.
3. The process of claim 1 in which the additive is selenium.
4. The process of claim 1 in which the additive is selenium chloride.
5. The process of claim 1 in which the additive is tellurium chloride.
6. The process of claim 1 in which the additive is sulfur monochloride.

ALFRED JEROME KOLKA.
HAROLD DAVID ORLOFF.

REFERENCES CITED

The following references are of record in the file of this patent:

UNITED STATES PATENTS

| Number | Name | Date |
|---|---|---|
| 2,174,111 | Reed | Sept. 26, 1939 |
| 2,218,148 | Hardie | Oct. 15, 1940 |
| 2,438,900 | Cooke et al. | Apr. 6, 1948 |

FOREIGN PATENTS

| Number | Country | Date |
|---|---|---|
| 469,299 | Belgium | Dec. 1, 1946 |